United States Patent
Wang

(10) Patent No.: US 8,135,877 B2
(45) Date of Patent: Mar. 13, 2012

(54) ELECTRONIC DEVICE CAPABLE OF PROTECTING USB PORTS AND METHOD THEREOF

(75) Inventor: Kui-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 245 days.

(21) Appl. No.: 12/538,842

(22) Filed: Aug. 10, 2009

(65) Prior Publication Data

US 2010/0312923 A1    Dec. 9, 2010

(30) Foreign Application Priority Data

Jun. 9, 2009 (CN) .......................... 2009 1 0303090

(51) Int. Cl.
*G06F 3/00* (2006.01)

(52) U.S. Cl. .......................................... 710/16; 715/772
(58) Field of Classification Search .................. None
See application file for complete search history.

(56) References Cited

U.S. PATENT DOCUMENTS

| | | | | |
|---|---|---|---|---|
| 2001/0035881 | A1* | 11/2001 | Stoakley et al. | 345/772 |
| 2004/0267973 | A1* | 12/2004 | Sumida et al. | 710/8 |
| 2006/0006233 | A1* | 1/2006 | Chang et al. | 235/441 |
| 2009/0251727 | A1* | 10/2009 | Yokomizo et al. | 358/1.15 |

* cited by examiner

*Primary Examiner* — Elias Mamo
(74) *Attorney, Agent, or Firm* — Altis Law Group, Inc.

(57) ABSTRACT

A method of protecting an electronic device's USB ports is provided. The method includes: determining whether an external device is connected to a USB port of the electronic device; determining which driver is for driving the external device connected to the USB port according to a primary ID of the external device; determining whether the external device is currently being driven by the driver; displaying an icon corresponding to the external device if the external device is not currently being driven by the driver; and running the driver to drive the external device when the icon is clicked. A related electronic device is also provided.

14 Claims, 5 Drawing Sheets

ELECTRONIC DEVICE CAPABLE OF PROTECTING USB PORTS AND METHOD THEREOF

BACKGROUND

1. Technical Field

The disclosure relates to electronic devices and, particularly, to an electronic device capable of protecting its universal serial bus (USB) ports, and a method thereof.

2. Description of Related Art

When users finish using a USB device such as a USB flash drive on an electronic device such as a computer, the users usually operate a displayed icon to terminate the communication between the USB device and the electronic device. If the users want to use the USB device again, they have to pull out the USB device and insert the USB device into a USB port of the electronic device once again. If the USB device is inserted into and pulled out from a USB port of the electronic device frequently, the USB port of the electronic device may be damaged.

BRIEF DESCRIPTION OF THE DRAWINGS

The components of the drawings are not necessarily drawn to scale, the emphasis instead being placed upon clearly illustrating the principles of an electronic device capable of protecting USB ports and method thereof. Moreover, in the drawings, like reference numerals designate corresponding parts throughout several views.

DETAILED DESCRIPTION

Figure 1:
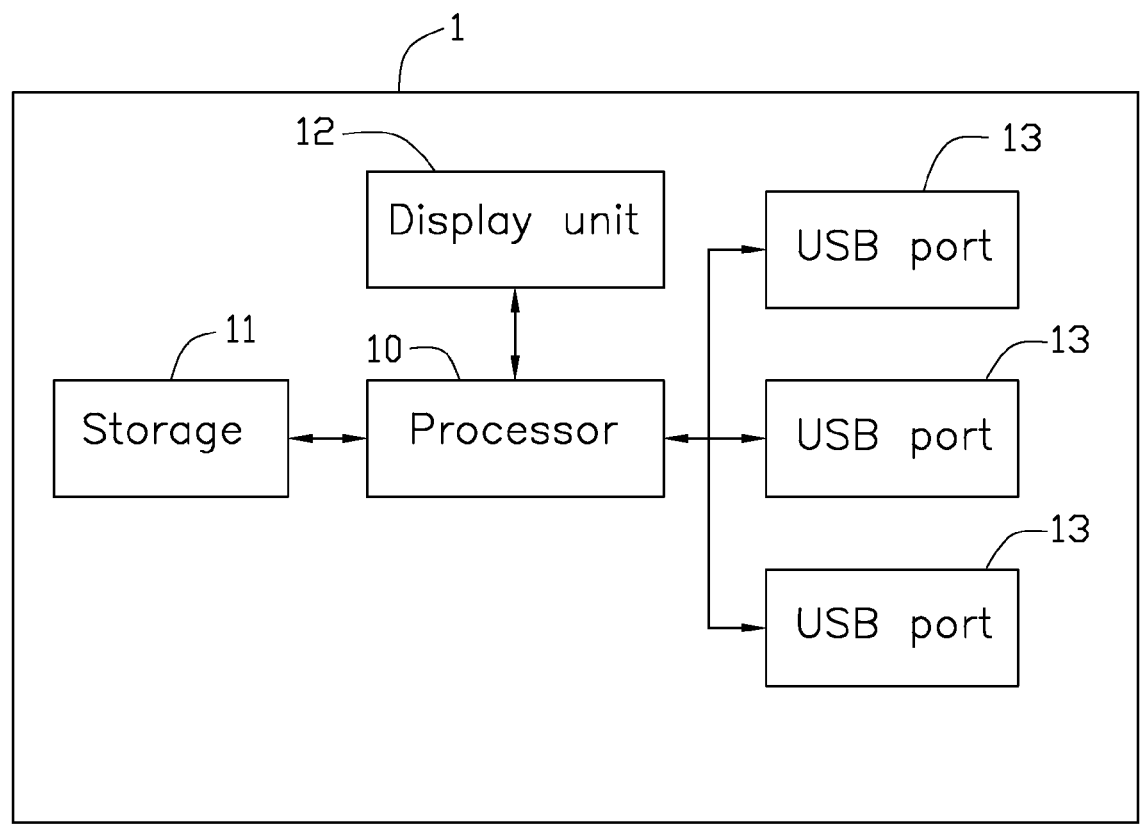
FIG. 1 is a block diagram of an electronic device capable of protecting USB ports in accordance with an exemplary embodiment.

FIG. 1 is a block diagram of an electronic device 1 capable of protecting USB ports in accordance with an exemplary embodiment. The electronic device 1 includes a processor 10, a storage 11, a display unit 12, and one or more USB ports 13. An external device having a USB connector such as a USB flash drive can be connected to a USB port 13 of the electronic device 1. The storage 11 is configured for storing one or more drivers for driving the external devices which are connected to the USB ports 13 of the electronic device 1. A driver is for driving one type of the external device, or for driving various types of the external devices.

Figure 2:
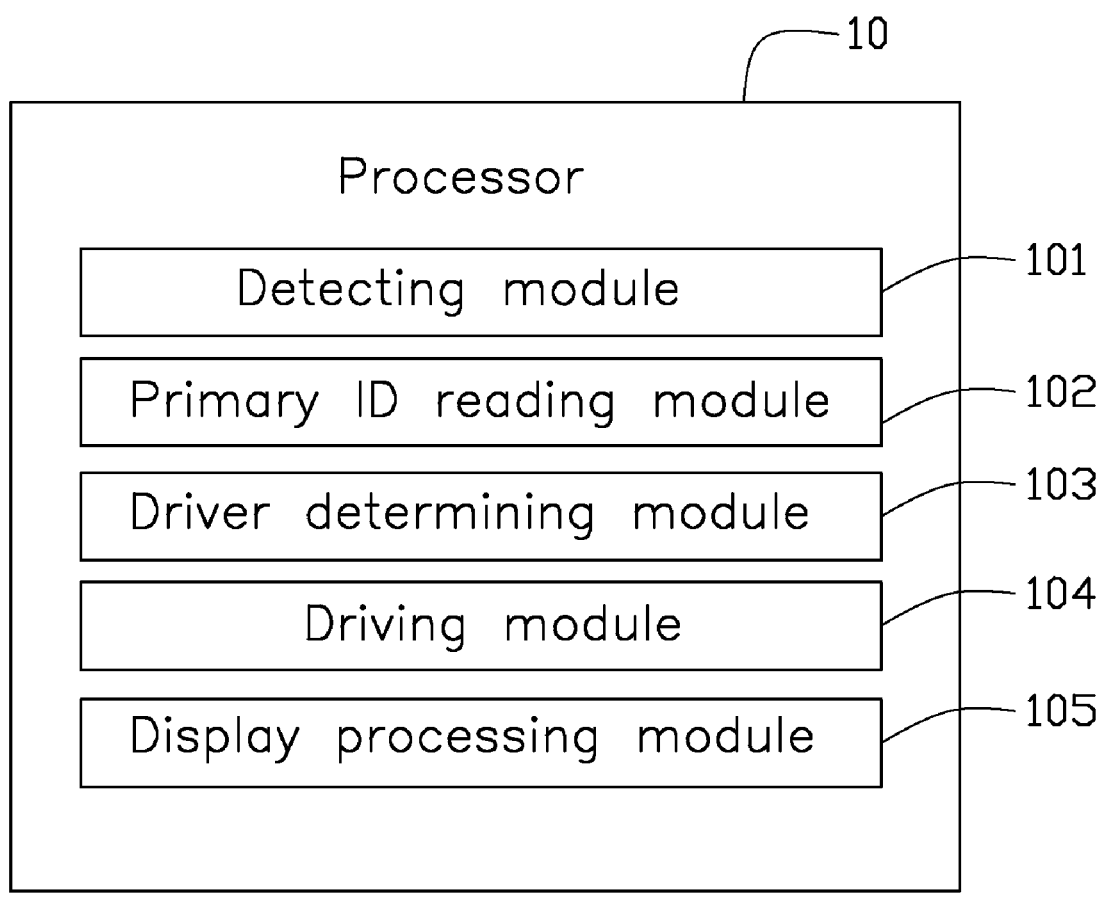
FIG. 2 is a block diagram of main function modules of a processor of the electronic device of FIG. 1 in accordance with an exemplary embodiment.

FIG. 2 is a block diagram of main function modules of the processor 10 in accordance with an exemplary embodiment. The function modules include a detecting module 101, a primary identification (ID) reading module 102, a driver determining module 103, a driving module 104, and a display processing module 105.

The detecting module 101 is configured for detecting whether one or more external devices are connected to the USB ports 13 of the electronic device 1 at predetermined time intervals. In the exemplary embodiment, the detecting module 10 determines an external device is connected to a USB port 13 of the electronic device 1 when the detecting module 101 determines that the voltage of a power pin of the USB port 13 is at a predetermined value. In another exemplary embodiment, the detecting module 101 determines an external device is connected to a USB port 13 of the electronic device 1 when the detecting module 101 determines that communication exists between the external device and the USB port 13.

The primary ID reading module 102 is configured for reading the primary ID of an external device which is connected to a USB port 13 of the electronic device 1. The primary ID is pre-existing in the external device and contains information of the type of the driver required for driving the external device. The electronic device 1 selects a driver for driving the external device according to the external device's primary ID.

The driver determining module 103 is configured for determining whether an external device connected to a USB port 13 of the electronic device 1 is currently being driven by a driver. In the exemplary embodiment, the driver determining module 103 firstly determines what driver is needed for driving the external device according to the external device's primary ID, and then determines whether the driver is running. If the driver is not running, the driver determining module 103 determines the external device is not currently being driven by the driver. If the driver is running, the driver determining module 103 further determines whether the driver is driving the external device, because the driver may be currently employed to drive another external device connected to another USB port 13 of the electronic device 1. In the exemplary embodiment, an address mapping is generated and exists between a driver and a USB port 13 which is connected to an external device being driven by the driver, thus the driver determining module 103 determines whether an external device is driven by a driver by determining whether such an address mapping exists between the driver and the USB port 13 connected to the external device.

Figure 3:
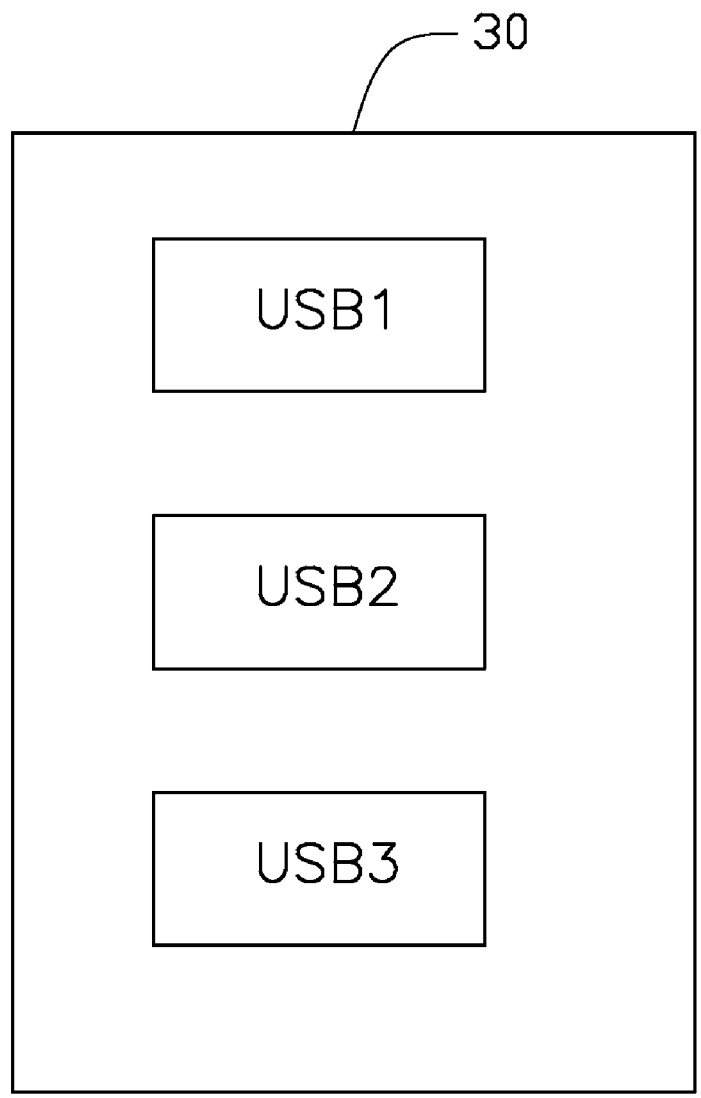
FIG. 3 is a schematic view of a displayed window in accordance with an exemplary embodiment.

Referring also to FIG. 3, in this embodiment, if the driver determining module 103 determines that an external device connected to a USB port 13 of the electronic device 1 is not currently being driven, the display processing module 105 displays an icon of the USB port 13 in a window 30 on the display unit 12. By way of example, the electronic device 1 has more than three USB ports 13, and each USB port 13 is assigned an icon such as USB1, USB2, USB3 and so on. If the driver determining module 103 determines an external device connected to a USB port 13 with an icon USB 1 is not currently being driven, the display processing module 105 displays the icon "USB1" in the window 30.

In another embodiment, if the driver determining module 103 determines that an external device connected to a USB port 13 of the electronic device 1 is not currently being driven, the display processing module 105 displays a special icon on the display unit 12. The special icon represents that there is at least one external device connected to the USB ports 13 of the electronic device 1 that is not currently being driven. When the special icon is clicked, the display processing module 105 displays the window 30 on the display unit 12, and the icons of the USB ports 13 which are connected to non-driven external devices are listed in the window 30. If none of the icons listed in the window 30 is clicked by a user within a predetermined time interval, the display processing module 105 hides the window 30.

If an icon in the window 30 is clicked within the predetermined time interval, the driving module 104 selects a driver for an external device connected to the USB port 13, whose icon was clicked, from the storage 11 and starts up the driver. In this embodiment, if an icon is clicked, the display processing module 105 deletes the clicked icon from the window 30. In another embodiment, if an icon is clicked, the display processing module 105 disables the icon by graying it out. If the driver determining module 103 determines that the external device connected to the USB port 13 whose sign has been grayed out is not currently being driven by the driver, for example, when communication between the electronic device 1 and the external device has been terminated by a user, the display processing module 105 enables the icon again by un-graying the sign.

Figure 4:
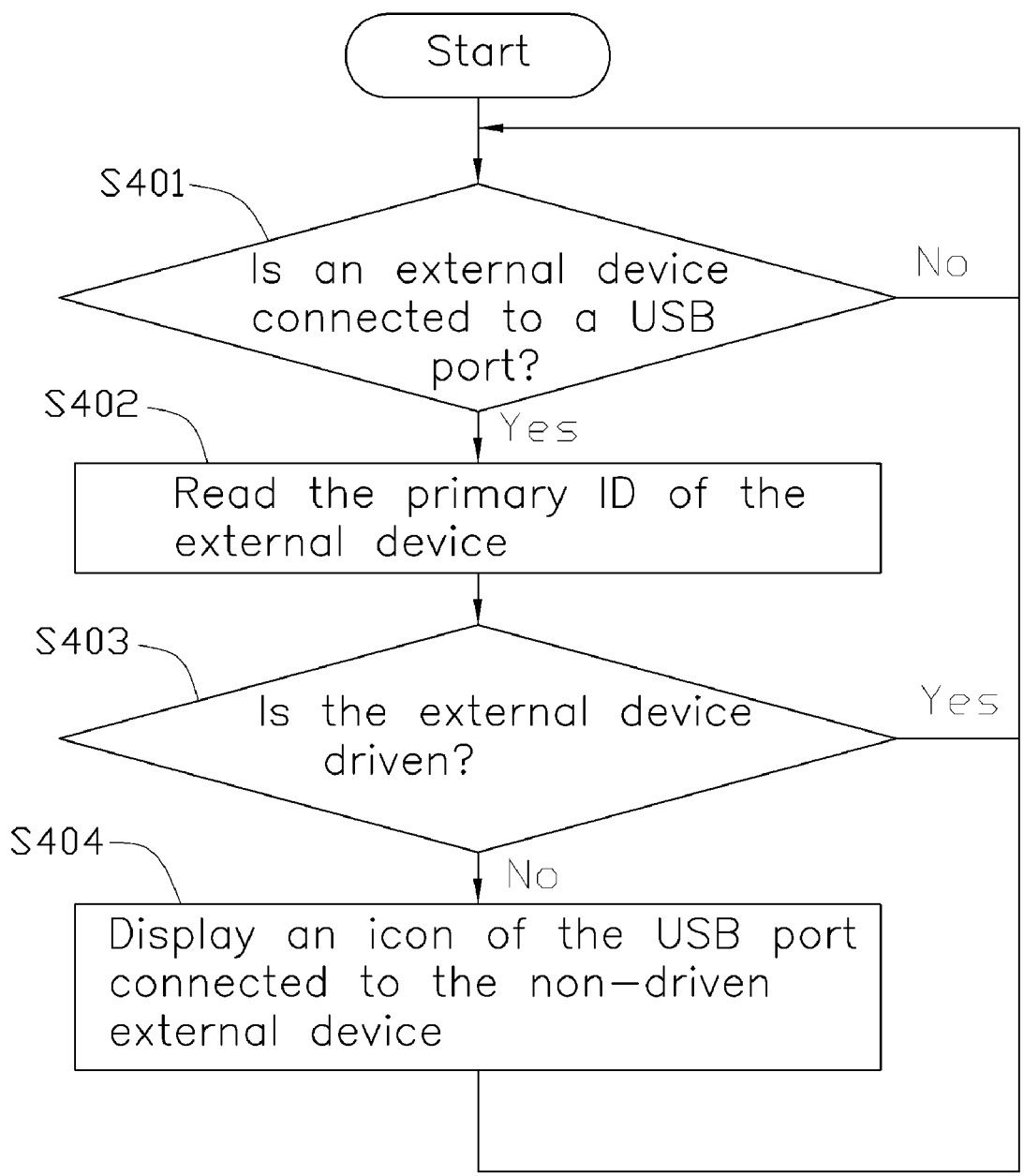
FIG. 4 is a flowchart of a method of detecting whether an external device is connected to a USB port of the electronic device of FIG. 1, in accordance with an exemplary embodiment.

FIG. 4 is a flowchart of a method of detecting whether an external device is connected to a USB port 13 of the electronic device 1 in accordance with an exemplary embodiment.

In step S401, the detecting module 101 detects whether an external device is connected to a first USB port 13 of the electronic device 1 at preset time intervals. If yes, the procedure goes to step S402, otherwise the detecting module 101 continues to detect whether an external device is connected to a next USB port 13 of the electronic device 1. In the exemplary embodiment, the detecting module 101 determines that an external device is connected to a USB port 13 of the electronic device 1 when the detecting module 101 determines the voltage of a power pin of the USB port 13 is at a predetermined value.

In step S402, the primary ID reading module 102 reads the primary ID of the external device. The primary ID is pre-existing in the external device and contains information of the type of the driver required for driving the external device. The electronic device 1 selects a driver for driving the external device according to the external device's primary ID.

In step S403, the driver determining module 103 determines whether the external device is currently being driven by the driver. If yes, the procedure goes to step S401, otherwise the procedure returns to step S404. In the exemplary embodiment, the driver determining module 103 firstly determines which driver is for the external device according to the external device's primary ID, and then determines whether the driver for the external device is running. If the driver is not running, the driver determining module 103 determines the external device is not currently being driven. If the driver is running, the driver determining module 103 further determines whether the driver is driving the external device.

In step S404, the display processing module 105 displays the icon of the USB port 13 in the window 30 on the display unit 12.

In another embodiment, if the driver determining module 103 determines that an external device connected to a USB port 13 of the electronic device 1 is not currently being driven by the driver, the display processing module 105 displays a special icon on the display unit 12. The special icon represents there is at least one external device connected to the USB ports 13 of the electronic device 1 that is not currently being driven. When the special icon is clicked, the display processing module 105 displays the window 30 on the display unit 12, and the icons of the USB ports 13 which are connected to non-driven external devices are listed in the window 30. If none of the icons listed in the window 30 is clicked by a user within a predetermined time interval, the display processing module 105 hides the window 30.

Figure 5:
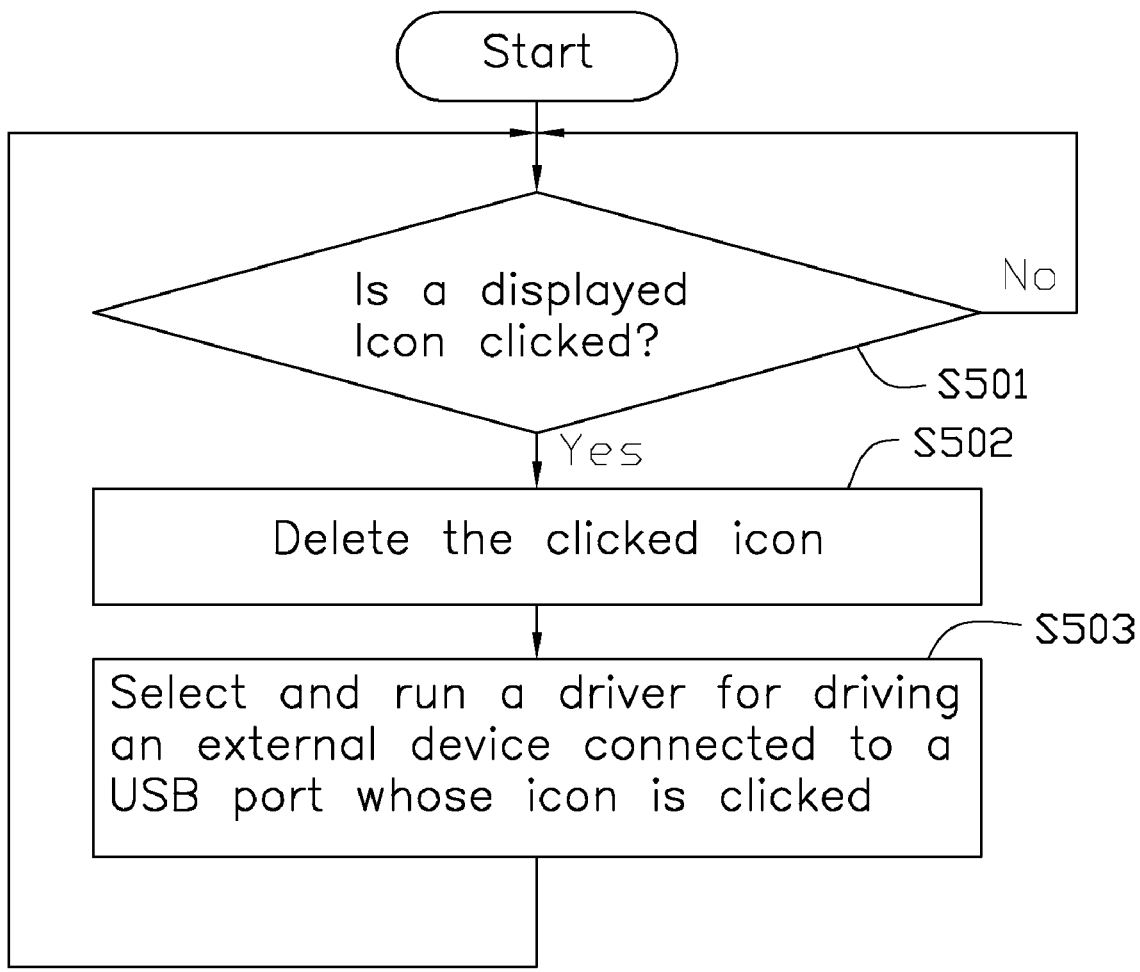
FIG. 5 is a flowchart of a method of selecting a driver to drive an external device which is connected to a USB port of the electronic device of FIG. 1, in accordance with an exemplary embodiment.

FIG. 5 is a flowchart of a method of selecting a driver to drive an external device which is connected to a USB port 13 of the electronic device 1 in accordance with an exemplary embodiment.

In step S501, the display processing module 105 determines whether an icon listed in the window 30 is clicked by a user. If yes, the procedure goes to step S502, otherwise the procedure continues to execute step S501.

In step S502, the display processing module 105 deletes the clicked icon from the window 30.

In another embodiment, if an icon is clicked, the display processing module 105 disables the icon by graying it out. If the driver determining module 103 determines an external device connected to the USB port 13 whose icon has been grayed out is not currently being driven by the driver, for example, when communication between the electronic device 1 and the external device has been terminated by a user, the display processing module 105 enables the icon by un-graying the icon.

In step S503, the driving module 104 selects a driver for driving an external device connected to a USB port 13, whose icon was clicked, from the storage 11 and starts up the driver.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device capable of protecting Universal Serial Bus (USB) ports, comprising:
at least one USB port;
a storage configured for storing at least one driver, wherein the driver is for driving at least one type of external device;
a detecting module configured for determining whether an external device is connected to one of the at least one USB port of the electronic device at predetermined time intervals;
a primary Identification (ID) reading module configured for reading a primary ID of the external device which is connected to the USB port of the electronic device, wherein the primary ID corresponds to a driver for driving the external device;
a driver determining module configured for determining the driver for driving the external device according to the primary ID and determining whether the external device is currently being driven by the driver;
a display processing module configured for displaying an icon corresponding to the external device on a display unit of the electronic device if the external device is not currently being driven by the driver, and determining whether the icon is clicked by a user; and
a driving module configured for starting up the driver to drive the external device if the icon is clicked by the user,
wherein, the display processing module is further configured for displaying a special icon on the display unit, the special icon representing external devices connected to the USB ports of the electronic device that are not currently being driven, and icons corresponding to the non-driven external devices are displayed on the display unit when the special icon is clicked.

2. The electronic device as described in claim 1, wherein the detecting module determines that the external device is connected to the USB port when the detecting module determines that the voltage of a power pin of the USB port is at a predetermined value.

3. The electronic device as described in claim 1, wherein when the driver determining module determines whether the external device is currently being driven by the driver, the driver determining module determines whether the driver is running, if the driver is not running, the driver determining module determines that the external device is not currently being driven; and if the driver is running, the driver determining module further determining whether the driver is driving the external device.

4. The electronic device as described in claim 1, wherein the display processing module is further configured for deleting the icon from the display unit when the icon is clicked.

5. The electronic device as described in claim 1, wherein the display processing module is further configured for disabling the icon when the icon is clicked.

6. The electronic device as described in claim 5, wherein the display processing module is further configured for enabling the disabled icon if the driver determining module determines the driver is terminated to drive the external device.

7. The electronic device as described in claim 1, wherein if none of the icons is clicked within predetermined time interval, the display processing module hides the icons.

8. A method of protecting an electronic device's Universal Serial Bus (USB) ports, the method comprising:
- determining whether an external device is connected to a USB port of the electronic device at predetermined time intervals;
- reading a primary Identification (ID) of the external device connected to the USB port of the electronic device when the external device is determined to be connected to the one of the USB ports, wherein the primary ID corresponds to a driver for driving the external device;
- determining a driver needed for driving the external device according to the primary ID;
- determining whether the external device is currently being driven by the driver;
- displaying an icon corresponding to the external device on a display unit of the electronic device if the external device is not currently being driven by the driver;
- starting up the driver to drive the external device when the icon is clicked by a user; and
- displaying a special icon on the display unit, the special icon representing external devices connected to the USB ports of the electronic device that are not currently being driven, and icons corresponding to the non-driven external devices are displayed on the display unit when the special icon is clicked.

9. The method as described in claim 8, wherein the step of determining whether an external device is connected to a USB port of the electronic device comprising:
- determining whether the voltage of a power pin of the USB port is at a predetermined value.

10. The method as descried in claim 8, wherein the step of determining whether the external device is driven comprising:
- determining whether the driver is running;
- determining that the external device is not currently being driven by the driver if the driver is not running; and
- determining whether the driver is driving the external device if the driver is running.

11. The method as described in claim 8, further comprising:
- deleting the icon from the display unit when the icon is clicked.

12. The method as described in claim 8, further comprising:
- disabling the icon when the icon is clicked.

13. The method as described in claim 12, further comprising:
- enabling the disabled icon if the driver is terminated to drive the external device.

14. The method as described in claim 8, further comprising:
- hiding the icon if the icon is not clicked by the user within a predetermined time interval.

* * * * *